(12) United States Patent
Hyden et al.

(10) Patent No.: US 12,160,621 B2
(45) Date of Patent: Dec. 3, 2024

(54) MITIGATING COSTS OF PRESENTATION AND DELIVERY OF DIGITAL MEDIA ASSETS BASED ON GEOGRAPHICALLY DISTRIBUTED CACHE MEMORY CONTENTS

(71) Applicant: IRIS.TV, INC., Los Angeles, CA (US)

(72) Inventors: Richard James Hyden, Jersey City, NJ (US); Joel Spitalnik, Los Angeles, CA (US); Thomas J Sullivan, Los Angeles, CA (US)

(73) Assignee: IRIS.TV, INC., Los Angeles, CA (US)

( * ) Notice: Subject to any disclaimer, the term of this patent is extended or adjusted under 35 U.S.C. 154(b) by 0 days.

(21) Appl. No.: 16/285,147

(22) Filed: Feb. 25, 2019

(65) Prior Publication Data
US 2020/0275139 A1 Aug. 27, 2020

(51) Int. Cl.
*H04N 21/231* (2011.01)

(52) U.S. Cl.
CPC . *H04N 21/23106* (2013.01); *H04N 21/23103* (2013.01); *H04N 21/23113* (2013.01); *H04N 21/23116* (2013.01)

(58) Field of Classification Search
CPC ....... H04N 21/23106; H04N 21/23103; H04N 21/23113; H04N 21/23116

USPC ......................................................... 725/145
See application file for complete search history.

(56) References Cited

U.S. PATENT DOCUMENTS

| | | | |
|---|---|---|---|
| 2012/0151511 A1* | 6/2012 | Bernard | H04H 60/46 725/10 |
| 2013/0204961 A1* | 8/2013 | Fliam | G06F 3/0649 709/214 |
| 2013/0263194 A1* | 10/2013 | Zhang | H04L 67/2842 725/92 |
| 2015/0040173 A1* | 2/2015 | Panagos | H04N 21/2225 725/116 |
| 2015/0312367 A1* | 10/2015 | Huici | H04L 67/1097 709/213 |
| 2016/0027057 A1* | 1/2016 | Sullivan | G06Q 30/0263 705/14.6 |
| 2017/0041421 A1* | 2/2017 | Liu | H04L 67/2842 |
| 2019/0042585 A1* | 2/2019 | Ploshykhyn | G06F 16/24578 |

\* cited by examiner

*Primary Examiner* — Joshua D Taylor
(74) *Attorney, Agent, or Firm* — Shield Intellectual Property PC; Kirk D. Wong

(57) ABSTRACT

An anchor asset is selected among a plurality of assets based on a caching gain calculation for the anchor asset. A variety of assets are selected from the plurality of assets based on a relationship with the anchor asset, the variety of assets including any combination of: audio, video, text, image, etc. The anchor asset and the variety of assets are cached on one or more geographically diverse servers among a plurality of servers for delivery to client devices.

20 Claims, 12 Drawing Sheets

Selecting of Recommended Asset List for Caching

Engagement Cycle

Ordered List of Digital Assets

Selection of Assets from a Library Located in a Specific Place

Accumulation of Value

| Storage Location 601 | User Location 602 | Delivery Cost per Asset (Current Location) 603 | Candidate Storage Location 604 | Distributed Delivery Cost (Candidate Location) 605 | Cost Difference 606 | Decision 607 |
|---|---|---|---|---|---|---|
| Central USA | USA, California | 0.002 | Central USA | 0.002 | - | |
| | | | Western USA | 0.001 | -0.001 | Make Asset Available in Western USA Location |
| | | | Central India | 0.008 | +0.006 | |
| | USA, New York | 0.001 | Central USA | 0.001 | - | No Action |
| | | | Western USA | 0.003 | +0.002 | |
| | | | Central India | 0.006 | +0.005 | |
| | Thailand, Bangkok | 0.012 | Central USA | 0.012 | - | Make Asset Available in Central India Location |
| | | | Western USA | 0.009 | -0.003 | |
| | | | Central India | 0.006 | -0.006 | |

Fig. 6

Geographic Allocation of Asset Decision Example

| Asset, | Value per Unit V | Unit Delivery Cost (not cached) $C_1$ | Unit Delivery Cost (cached) $C_2$ | Estimated Consumption in time period T=[t, t+δ] $K_T$ | Π(Not Cached) $K_T(V − C_1)$ | Π(Cached) $K_T(V − C_2)$ | Caching Gain in time period T |
|---|---|---|---|---|---|---|---|
| 1 | 1.051 | 0.005 | 0.001 | 1,000 | 1,000(1.051-0.005) = 1,046 | 1,000(1.051-0.001) = 1,050 | 4 |
| 2 | 1.000 | | | 50,000 | 50,000(1.000-0.005)=49,750 | 50,000(1.000-0.001)=49,950 | 200 |
| ⋮ | ⋮ | | | ⋮ | ⋮ | ⋮ | ⋮ |
| n-1 | 2.130 | | | 4,000 | 4,000(2.130-0.005)=8,500 | 4,000(2.130-0.001)=8,516 | 16 |
| n | 0.900 | | | 22,000 | 22,000(0.900-0.005)=19,668 | 22,000(0.900-.001)=19,690 | 22 |

Fig. 7

Caching Analysis Example for a Fixed Geographic Center

| Gain Rank | Caching Gain in time period T | Asset Set | Cache? |
|---|---|---|---|
| 1 | 380 | 2 | Yes |
| 2 | 190 | S | Yes |
| 3 | 38 | S-1 | Yes |
| 4 | 9.95 | 1 | No |
| ... | ... | ... | No |
| n | | | No |

Available memory allows for $C(s)_T=3$ cached asset sets
801

Fig. 8a

Selecting of Recommended Asset List for Caching

Selecting of Recommended Asset List for Caching

Edge Server Caching

Selecting of Recommended Asset List for Caching

MITIGATING COSTS OF PRESENTATION AND DELIVERY OF DIGITAL MEDIA ASSETS BASED ON GEOGRAPHICALLY DISTRIBUTED CACHE MEMORY CONTENTS

TECHNICAL FIELD

The present disclosure generally relates to the delivery of multimedia content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 illustrates an example of determining the assignment of an asset to a geographic location for a set of storage location, user demand, and per-unit delivery costs, according to an embodiment of the invention;

FIG. 7 illustrates an example of caching assets in a geographic location to further reduce costs, according to an embodiment of the invention;

FIGS. 8a-b illustrate selection of a subset of asset sets when storage at a location is limited that respect the storage limits, according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   1.1. Variable Definitions
   1.2. Objective
2.0. Methodology
   2.1. Creation of the Geographic Dimension for Input Data
   2.2. Accumulation of Consumption Value
   2.3. Selection of Asset Sets for Pre-Computation
   2.4. Measurement of Computation Burden
   2.5. Measurement of Storage Burden
   2.6. Measurement of Delivery Costs
   2.7. Measurement of Value Gain
3.0. Example Embodiments
   3.1. Baseline Embodiment: Single Storage Locations with No Precomputations
   3.2. Embodiment: Multiple Storage Locations with No Precomputations
   3.3. Embodiment: Multiple Storage Locations with Precomputations
   3.4. Embodiment: Dynamic Hot Caching Across Edge Servers
4.0. The Asset Portfolio Manager as a Single Entity
5.0. Continuous Play Video Recommendations
6.0 Implementation Mechanisms—Hardware Overview
7.0. Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

This document refers to U.S. patent application Ser. No. 16/055,097, entitled "Presentation of Digital Media Assets Based on Assessed Value" filed on Aug. 4, 2018, owned by the Applicant and incorporated by reference in its entirety herein. In addition, U.S. patent application Ser. No. 14/811,824, entitled "Online Asset Recommendation System" filed on Jul. 28, 2015, U.S. patent application Ser. No. 14/811,803, entitled "Ensemble-Based Multimedia Asset Recommendation System" filed on Jul. 28, 2015, each owned by the Applicant and are incorporated by reference in their entirety herein.

Figure 1:
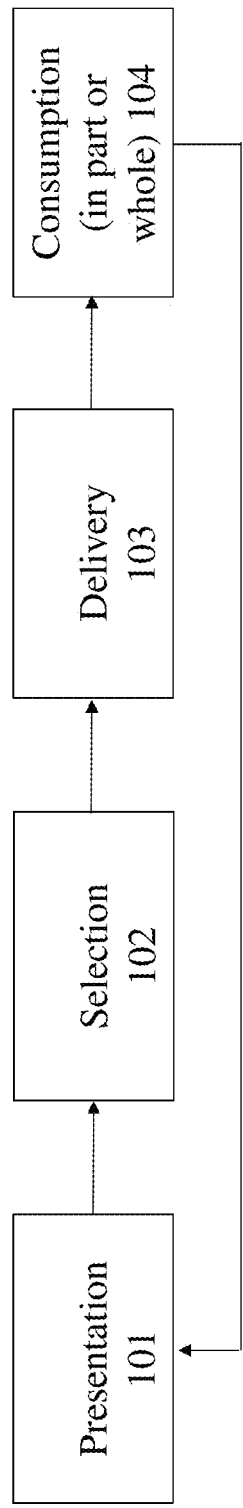
FIG. 1 illustrates an example cycle of asset engagement including presentation, selection, delivery, and consumption according to an embodiment of the invention.

Disclosed herein are systems and methods for pre-computation and geographically-distributed storage of sets of digital assets based on predictions of future geo-specific consumption of each asset. Embodiments of the invention reduce the burden of presenting and delivering a set of assets to an end user and thereby preserve a larger share of the value derived from consumption of the plurality of assets. The pre-computation and storage of assets to be delivered to users for consumption is based on the expected demand for consumable digital assets derived from analysis of historical consumption data and known levels of: a) a measure of value for each asset delivered and consumed during engagement(s) with the stored assets, b) a known burden associated with constructing sets of assets for consumption in various geographic locations, c) a burden associated with geographically-distributed storage, and d) a storage burden associated with delivery of each asset from its storage location to the end user. An asset may be any item or product that can be presented or represented (e.g., an item description, photograph of a physical item, sound file, article, blog post, advertisement, audio, video, text, image, etc.) in an online environment. An engagement may be defined as the temporal window, t, in which the user has focused sensory attention on the set of assets containing several components as shown in FIG. 1:

Online presentation 101 is the process of physically displaying assets in electronic form using available software and hardware in the case where the electronic assets displayed may be stored remotely from the display device.

Selection 102 is the process where a user chooses a specific asset or assets for future consumption. For purposes of generality, the selection process may be expanded to an asset set, which is a plurality of individual assets. This asset set contains at least one item but there is no theoretical limit on the number of items in the set, though sets of certain size may not be able to be assembled given the limited resources of the organization managing the asset library of the physical constraints of the delivery system.

Delivery 103 occurs when the asset(s) is made available for consumption and would include a tangible transfer of the asset to the user or the asset becomes consumable for online consumption. Like the selection stage, the delivery process during an engagement can reflect a single asset or a plurality of asset.

Consumption 104 of an electronically delivered asset occurs when the user engages the asset it such a way that the asset's value to the user is eroded due to sensory engagement by the user—this may be immediate and terminates when the end of the electronic file is reached or the user terminates the engagement with an element of the asset set. If a tangible asset(s) needs to be physically delivered to the user—consumption may begin upon receipt of the asset(s) by the user and terminates when the asset no longer hold value. For purposes of this discussion, there is no theoretical restriction on the ordering of consumption of members of an asset set—it may occur simultaneously for multiple assets, individually, or not at all. In some cases, however, the consumption of assets with a set is naturally sequential—for example, consuming a set of videos that are presented in an ordered set and where simultaneous consumption of more than one asset is either difficult or impossible.

An embodiment of the invention addresses the final three stages of the user's engagement window as shown in FIG. 1. In advance of the commencement of engagement where a user selects an asset set for delivery and eventual consumption, there are several decisions that can be made by an asset portfolio manager (APM), an entity located in a fixed physical site responsible for managing the asset portfolio (the APM may represent the interests of the asset portfolio owner, the manager of the geo-located distribution and storage system, or a third party delegated to hold responsibility for management of the asset portfolio, etc.). The APM may be an individual working on the system, the computing system itself, or a combination of a human/computing system. A fully-automated APM can operate as a standalone entity which may increase the overall efficiency of the geographic allocation of digital assets due to the ability to operate without human intervention. The APM decisions include:

The number of assets to include in an asset set (how many distinct assets are "bundled" for simultaneous delivery to a user—this could be single assets selected by a user, but may also include other assets which, if bundled, may also be consumed by the user).

Whether asset sets are to be constructed in advance of the user requesting delivery or constructed after the user performs an action that triggers the construction of asset sets.

Where the assets should be stored in order to enable delivery of assets to geographically-dispersed consumers for eventual consumption.

When the assets will be made available in the one or more storage locations.

If an asset set should be stored in such a way that it would allow immediate access of the sets at a lower delivery cost (the term 'hot cache' is used herein in conjunction with this feature).

An embodiment of the invention includes a process whereby an objective is determined by the asset portfolio manager (APM) and a set of actions are executed that transform raw input data into a prescribed set of actions that address the objective. Raw data may include: the geographic locations of digital asset processing nodes (where the hardware is located) and the computing/storage/delivery capacity available at each location, the size and contents of the digital asset portfolio available for delivery and consumption, the geographic location of a plurality of users and each user's or group of users' projected demand for assets in the future, etc.

During historical online engagements with a specific set of digital assets occurring during time period $\tau<t$, the various actions conducted by an individual user or plurality of users can be catalogued and leveraged to provide an estimation of the level of engagement for any digital asset during a future engagement window denoted by t. To bring clarity to the notation used here, t represents the entire engagement window beginning at time t and ending prior to time period t+1. For example, if a user's engagement window begins at t=2017 Aug. 15 14:02:01 UTC and ends at 2017 Aug. 15 15:07:22 UTC, the entire engagement window of 01:05:22 hours reflects the engagement and is denoted by the starting time point, t=2017 Aug. 15 14:02:01 UTC.

1.1. Variable Definitions $A_t=\{a_1, a_2, \ldots a_{N-1}, a_N\}$ a portfolio of N distinct assets available for consumption at time t.

g=an index for a specific geographic location where pre-determined sets of asset are stored for delivery to users selected from G possible storage locations: g=1,2, . . . ,G.

h=an index for a distinct geographic location (h=1, 2, . . . ,H) where a collection of users (containing at least 1 user per collection) are located and will consume a set of deliverable assets made available to them.

$c_t(h)$=a collection of users positioned at location h, at time t, where $C_t=\{c_t(1), c_t(2), \ldots, c_t(H)\}$ is the union of all possible distinct users, each belonging to one-and-only-one user collection $c_t(h)$ at time t.

$A_t(g)=\{a_{g,1}, a_{g,3}, \ldots, a_{g,M-1}, a_{g,M}\}$ the set of $M \leq N$ distinct assets stored at location g and available for delivery, $A_t(g) \in A_t$ at time t.

Figure 2:
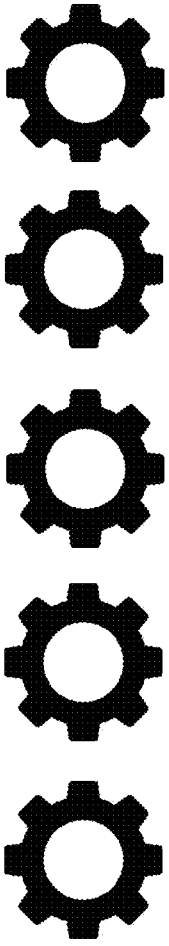
FIG. 2 illustrates an example ordered set of assets that can be presented and made available for selection and delivery, according to an embodiment of the invention.

$a_t(g)=\{a^{(1)}, a^{(2)}, \ldots, a^{(S)}\}$ the set of S distinct ordered assets to be made available for consumption at time t stored in a geographic location, g. Each distinct asset in the $p^{th}$ set position, $a^{(s)}$ is drawn from the portfolio of assets, $A_t(g)$. An illustration of such a set can be seen in FIG. 2 where there are S=5 distinct ordered assets (201-205) in positions s=1, 2,3,4,5. Computation of asset sets is an operation allows the delivery of bundles of assets that can be:

a) individually selected by a user or by an algorithm that builds sets of similar assets that the APM believes will be consumed by the user to whom it is delivered, or b) built in advance of user engagements with the expectation that consumption of assets as an ordered set will likely occur.

An example would be a list of assets that are recommended by the APM for consumption—also known as a "recommendation set"—in the online video or music industries—a playlist.

Figure 3:
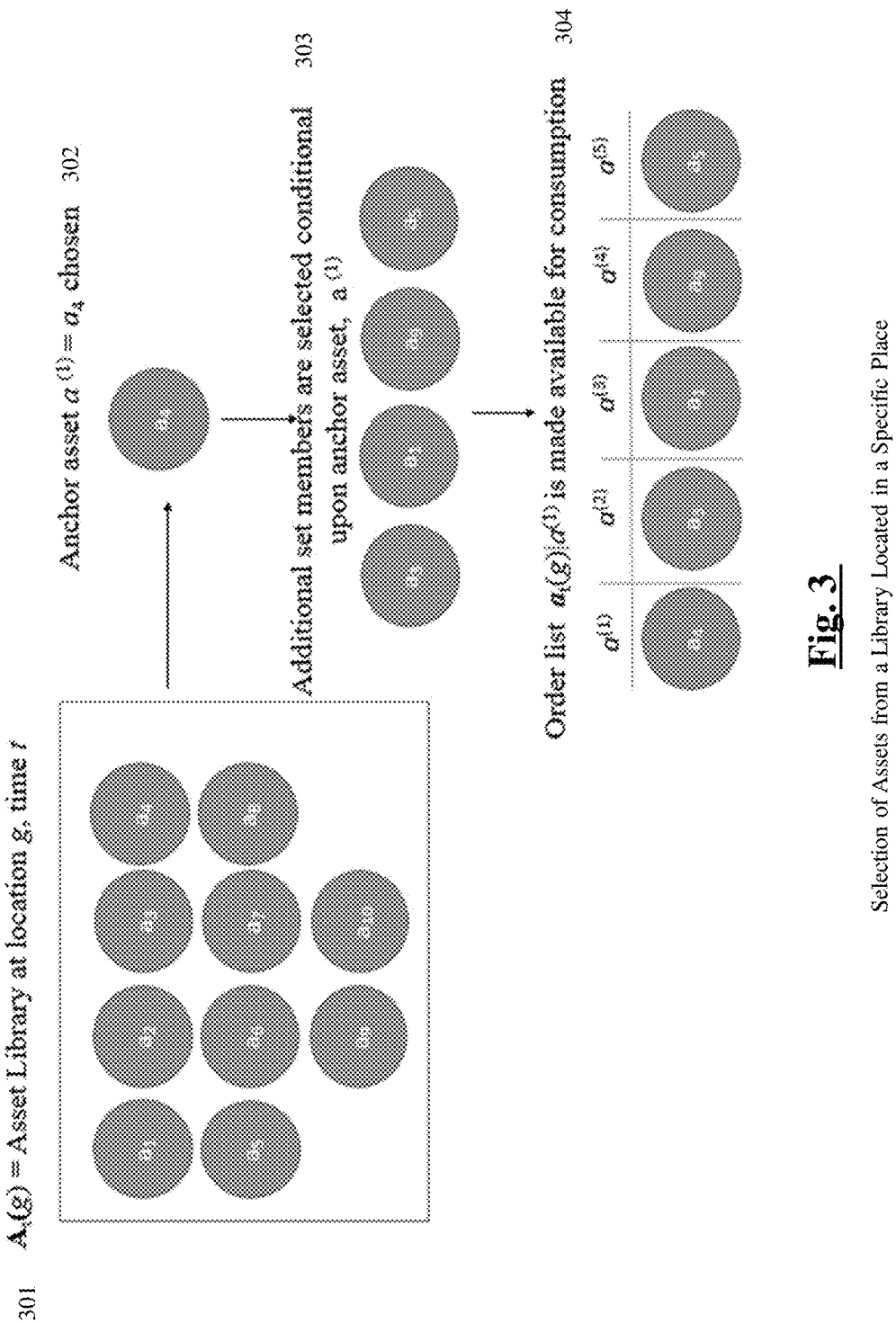
FIG. 3 illustrates an example selection of a set of assets located in a fixed geographic location for delivery to a user in any geographic location, according to an embodiment of the invention.

Referring to FIG. 3, an example of the process for selection of items for inclusion in the computed set 304 is shown. $a^{(1)}$ is the anchor asset 302—or first ordered asset—in the set $a_t(g)$ 301. The remaining elements $a^{(2)}, \ldots, a^{(n)}$ of the set are called the computed assets. The anchor asset—the first ordered asset in a recommendation set has distinct characteristics that differ from the computed assets in the set. First, the events that trigger presentation and consumption of the anchor asset are initiated by the user based on their interests. Triggering could be initiated by the identifying interest in an asset outside of the system using various approaches such as digital search, visiting a site that presents digital assets, or using a mouse or other device to begin consumption (for example, clicking the 'start' button on a digital video or clicking on a link to a digital asset). The computed assets, however, are not selected by the user but rather by a recommendation system that selects additional assets (to follow the anchor asset sequentially in the recommendation set).

The computed assets are selected for inclusion in the set 303 under two possible scenarios:

they are not pre-selected for membership in the set $a_t(g)$ until the anchor asset is selected for delivery and consumption at the start of the engagement at time t. In this scenario, the set of assets dynamically-determined upon selection of $a^{(1)}$ is denoted by $d_t(g)=(a_t(g)|a^{(1)})$ they are pre-determined for inclusion in the set $a_t(g)$ 304 prior to the selection of $a^{(1)}$ 302 and each member of the set remains in its original pre-determined position for the duration of a user's engagement in time t. In this scenario, the set of assets pre-determined is denoted by $p_t(g)$. In an example of how the anchor asset is utilized, the first asset, the anchor asset, to be consumed in an ordered set, is used to build a larger set of assets is the recommended set/playlist as described above. The utility of this operation would lie in the efficiency and increased value that can be derived by delivering bundles of assets that are conditionally determined upon a user explicitly selecting an item for delivery and consumption. Should the user also receive the additional consumable assets (the computed set) along with the anchor asset, he/she might also consume the additional assets presented sequentially with the expectation that, due to their similarity with the anchor asset (or other assets in the set), they may also appeal to the user's preferences. It is assumed that the engagement will begin with the first asset in the sequence—the anchor asset—but the consumption of the remaining assets in the set may be consumed non-sequentially when a mechanism for re-ordering the computed set is implemented.

u=is a common unit of measure to be assigned to both: a) the value derived from a user's consumption of all or part of a set of available assets, $a_t(g)$, and b) the burden associated with providing the user with the ability to have assets available and delivered for consumption to geographic location h from geographic location g reflecting the size of the asset sets in $d_t(g)$ and/or $p_t(g)$.

The common unit, u, need not be monetary but rather a unit of measure that can be associated with derived value and burden similar to the concept of utility used in economics. A non-exhaustive list of example units of measure includes:

currency (US Dollars ($) or Euros (€)) realized per consumed asset or as sets, number of times the identity of the asset was shared in a social media environment, change in market share resulting from engagement, time allocated to engagement, customer loyalty, or the general term used in economics utilities.

$\gamma_t(g \to h)$=a storage location/consumption location pair indicating delivery of assets to user collection $c_t(h)$ from storage location g at time t.

$v_t(a_i)$=the value (measured in units u) derived from consumption (in part or in whole) of asset $a_i$ during time t, and elements of a set of assets made available for consumption.

A more detailed explanation of the process behind ascribing a time-based value to digital assets may be found in U.S. patent application Ser. No. 16/055,097, entitled "Presentation of Digital Media Assets Based on Assessed Value". The value reflects the merits of the benefit of ownership of the asset including the ability to exchange the asset for goods, services, money, goodwill, strategic advantage, economic utility, etc.

For purposes of simple explanation, it is assumed that the value associated with consuming asset $a_i$ does not differ by location of the user, h. The value may, however, be proportional to the fraction of the asset consumed. If $\theta_i$ is the full value that can possibly be attained by consumption of asset a and is the fraction of the asset consumed ($0 \leq \rho_{i,t} \leq 1$) in time period t, a non-exhaustive list embodiments of this proportional value are:

1) binary—the full value is derived if any portion of the asset is:

$$v_t(a_i) = \begin{cases} \theta_{i,t} & \text{if } \rho_{i,t} \geq 0 \\ 0 & \text{otherwise} \end{cases}$$

2) continuous—proportional to fraction consumed:

$$v_t(a_i) = \rho_{i,t} \times \theta_{i,t}$$

3) multi-state—taking on one of many values based on consumption of a discontinuous sets of non-overlapping and binned fractions over the range [0,1], for example:

$$v_t(a_i) = \begin{cases} \theta_i, t & \text{if } \rho_{i,t} \geq 0.75 \\ 0.9 \cdot \theta_{i,t} & \text{if } 0.50 \geq \rho_{i,t} > 0.75 \\ 0 & \text{if } 0.50 > \rho_{i,t} \geq 0.00 \end{cases}$$

$f_{t,g}(a_1)$=the burden, measured in u, of storing an individual asset, $a_i$ at time t at geographic storage location g including the delivery of the asset(s) from the centralized location to the geographic storage site at location g.

$f_{t,g}(a_t;S)$=the burden, measured in u, of storing a set of assets $a_t(g)$ of length S, at time t at geographic storage location g.

$b_t(d(g);S-1)$=the burden, measured in u, of dynamically computing a set of additional assets $d_t(g)$ of length S−1 at time t and geographic storage location g after the initial asset $a^{(1)}$ has been delivered by a user.

$b_t(p(g);S)$=the burden, measured in u, of pre-computing a set of computed assets $p_t(g)$ of length S at time t and geographic storage location g base on the expected consumption (various methods for computing this expected consumption are available and not central to this invention, though is presumed that the expectation has been computed in such a way that the computation burden can be measured) of a specific anchor asset, $a^{(1)}$.

$w_t(\gamma(g \rightarrow h);1)$=the burden, measured in u, of delivering an anchor asset $a^{(1)}$ at time t from storage location g to user collection at location $c_h$—denoted by the pair $\gamma_t=(g \rightarrow h)$ $w_t(\gamma(g \rightarrow h);S-1)$=the burden, measured in u, of delivering a set of assets ($p_t(g)$) of size S—or $d_t(g)$ of size S−1) at time t from storage location g to user collection at location $c_h$—denoted by the pair $\gamma_t=(g \rightarrow h)$. If the computed set is delivered after selection of the anchor asset but not precomputed, the computed asset set size is S'=S−1. If the total set is precomputed before selection of the selection of the anchor asset, then S'=S.

$\hat{K}_{i,t}(h)$=the expected—usually a forecast based on historical engagement behavior—number of times that asset $a_i$ will be consumed in the initial/anchor position in time t at location h.

$q_t(g)$=The maximum number of asset sets $a_t(g)$ that may be pre-computed and stored at location g.

1.2. Objective

In an embodiment, the APSM's objective is to maximize the value gain measured in units u, between: a) the aggregate value derived from consumption of available digital assets and b) the total burden of computation, storage at the various G storage locations and the delivery of those assets to user across H locations. Hence, net value gain at time t is the accumulated realized consumption value that remains after subtracting the burden associated with making those assets eligible for consumption across a known geographic area ahead of consumption time. The range of the area may be as small as a fixed point where a single user is located, as large as the Earth's surface area, and even larger to include consumers located above or below the Earth's surface. For ease of discussion, this concept is first introduced without indexing by asset or location; let value gain derived by selection, delivery, and presentation of assets during temporal engagement window t be:

gain=value−burden or, $$\pi_t=(v_t-b_t) \quad \text{[Equation 1]}.$$

The Asset Portfolio Manager's (APM) objective function is then:
Maximize:

$$\pi_t \text{ subject to constraints } \Lambda=\{A_t,G,H,\hat{K}_t,v_t,B_t,q\} \quad \text{[Equation 2]}$$

Where:
$A_t$=the total library of assets available at time t.
G=the plurality of locations available for storage, location, and delivery point of origin.
H=the plurality of locations where asset sets will be delivered and consumed of origin.
$\hat{K}_t$=the expected number of consumed assets across all consumption locations.
$v_t$=the plurality of values that may be derived from consumption of the assets available in the total portfolio.
$B_t$=the plurality of burdens associated with the storage $\{f_{t,g}(a_i),f_{t,g}(a_t;S)$, computation of asset sets $b_{t,}(d(g);S-1), b_{t,}(p(g);S)\}$ across all locations G and delivery from locations G to all locations H$\{w_{t,}(\gamma(g \rightarrow h);1), w_{t,}(\gamma(g \rightarrow h);S')\}$.
$q_t(g)$=The collection of limits across G computing/storage locations specifying the maximum number of individual assets $A_t(g)$ and asset sets $a_t(g)$ that may be pre-computed and stored at location g at time period t.

To achieve maximization of this constrained objective function, the APM can determine several input variables:
a) where the assets should be stored in order to enable delivering assets to geographically-dispersed consumers for eventual consumption,
b) the number of asset to include in an asset set (that is, how many distinct assets are "bundled" for simultaneous delivery to a user—this could be single assets selected by a user, but may also include other assets which, if bundled, may also be consumed by the user), and/or
c) whether asset sets be constructed in advance of the user requesting delivery or constructed after the user performs an action that triggers the construction of asset sets.

2.0 Methodology

The various constraints and conditions—including the indexed values and burden variables presented above—can be measured, stored, and assembled into a meaningful form allowing the APM to select the optimal set of input variables needed to achieve the optimal value of the objective function. The input variables include;
a) the known geographic locations of digital asset processing nodes (where the hardware is located) their individual computing/storage/delivery capacity,
b) the size and contents of the digital asset portfolio available for delivery and consumption, and/or
c) the geographic location of a plurality of users and their demand levels for assets in the future
d) any additional asset-level consideration that may affect the likelihood that an asset be selected for appearance in the recommendation (for example, third parties may bid to display an asset more often and/or in a specific position of some recommendation sets and pay a premium for doing so).
e) any known events that would affect the projection of future demand—based on historical demand observations (an example would be a scheduled 'tentpole' event that is associated with a high demand for digital assets such as a major awards show, holiday, or awards ceremony, etc.)

2.1. Creation of the Geographic Dimension for Input Data

Figure 4:
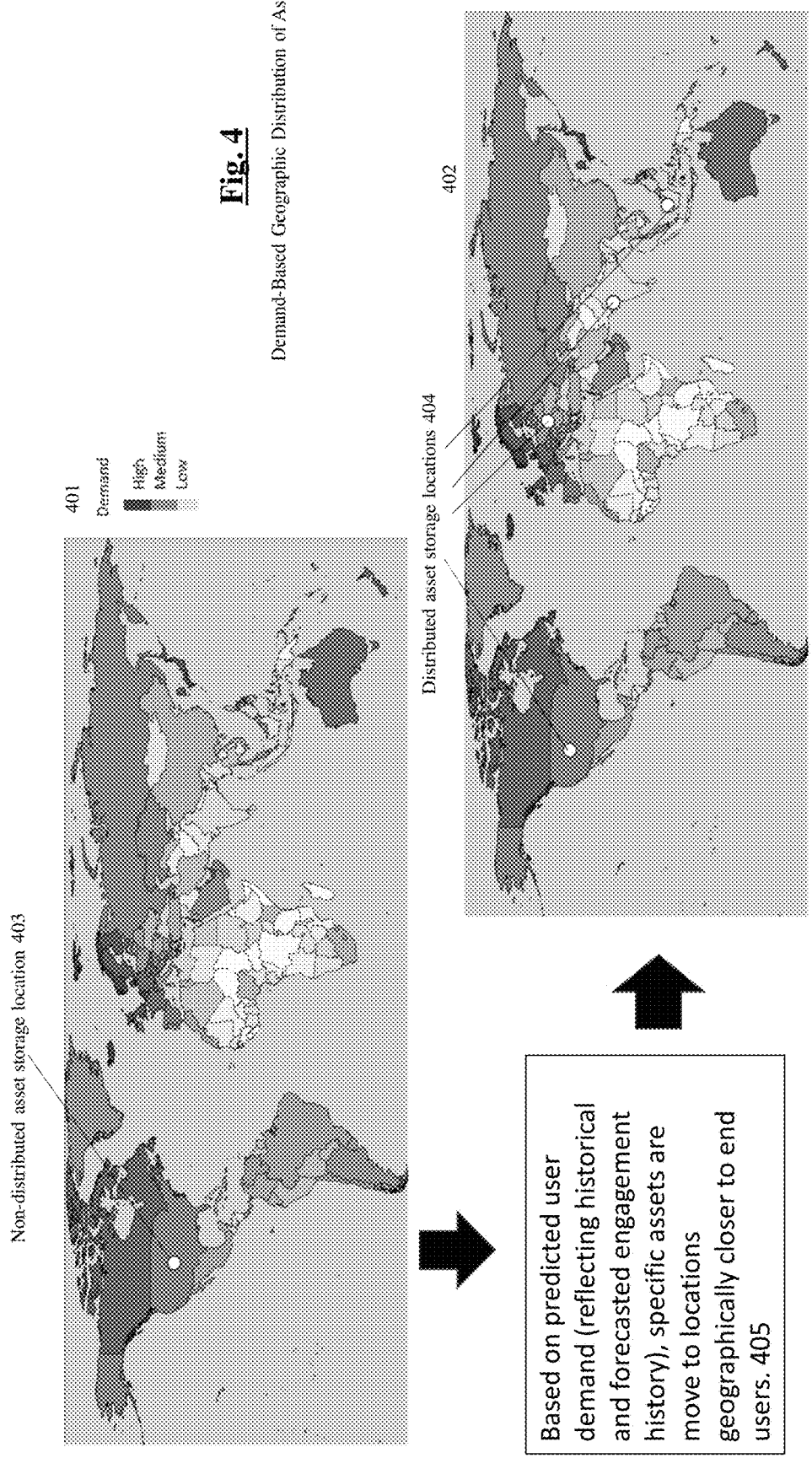
FIG. 4 illustrates an example determining geographic distribution of assets to lower delivery costs based on expected asset demand, according to an embodiment of the invention.

The various G locations where assets and asset sets may be stored, computed, and serve as points of origin for delivery are physical locations having the technological infrastructure capable of supporting these functions. The locations are assumed to be known to the APM along with the storage capacity $q_t(g)$, computing power, and delivery burden values associated with storage, computing, and delivery of assets and asset sets to various locations h. It is also assumed that the APM has established the necessary legal and technical arrangements to have the resources available for allocation of a library of assets $A_t(g)$ and asset sets derived from $A_t(g)$ at every engagement window t across all g=1,2, . . . ,G locations. FIG. 4 illustrates two cases: 401 where a single storage location (G=1) 403 is available to serve assets to all users within the Earth's atmosphere, and 402 reflecting a distributed set of five storage locations (G=5) 404 intended to be paired with users located in different partitions of the Earth's three-dimensional atmosphere.

The locations of users, h=1,2, . . . ,H, are based on a geographic portioning of all available points (in all three spatial dimensions; latitude, longitude, and altitude). In the case where every user is associated with a distinct location, h, the total number of delivery location H will be equal to the number of distinct user locations (a single user may change to a different location at any time, but they can be assumed to be at a fixed point for the duration of any distinct engagement).

It is possible, however to combine users into a fewer number of user collections $c_t(h)$, where the various members in the group share a delivery point. The 3-dimensional coordinates of the collections of users can be computed based on a geographic centroid (perhaps weighted by the amount of assets that are expected to be consumed by each distinct member of the user collection), another reference point (for example, the geo-center of the administrative polygon in which the individual users are located), or any other geographic reference point (e.g., the physical locations of Internet Service Providers, etc.). The use of administrative boundaries (continents, countries, states/provinces, neighborhoods, etc.) to assign users to locations is a convenient approach since it results in non-overlapping set of polygons so that each user, during an engagement window t, can be assigned to a distinct and unambiguous location 405. For example, if users are located in only two countries, USA and Australia, a simple partitioning may result in G=2 locations for user collections where all USA-located users belong to one user collection and all Australia-based users belong to the other, each having a geo-reference point indicating its location (e.g., the geographic centers of each of the two countries, etc.). A country may, of course, be divided into smaller partitions as long as each user can be associated with a distinct partition during an engagement window t. The portioning process is not central to this invention, but it is assumed that the APM has the ability to either conduct the partitioning or use the spatial partitions computed by an external party.

Figure 5:
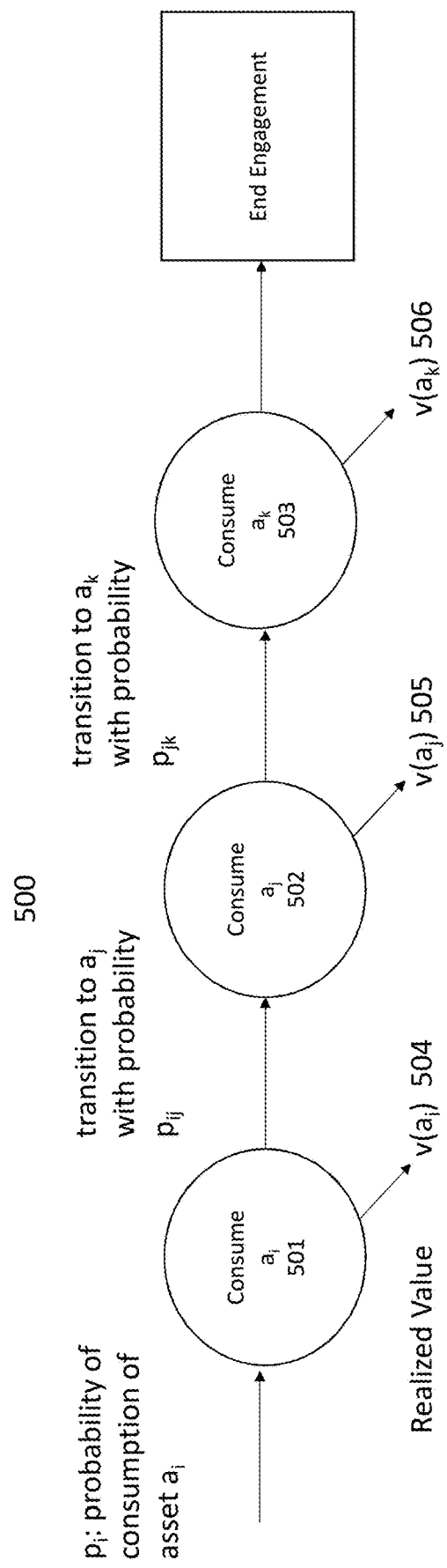
FIG. 5 illustrates an example of expected values of asset sets based on aggregation of individual probabilities of consumption and the value of consumption, according to an embodiment of the invention.

2.2. Accumulation of Consumption Value FIG. 5 illustrates how consumption of an asset set within an engagement window is accumulated. This is important because the underlying objective of the APM, when using embodiments to maximize the difference between value and burden—the numeric asset value data is desired to be known in order to measure the degree to which geographic allocation options will affect the target objective. In the example above, there are three assets in the set $a = \{a_i, a_j, a_k\}$ that may be consumed by a user. The user transitions from the zero/partial/or full-consumption of each ordered asset with some probability (the specific details surrounding these probabilities may be found in U.S. patent application Ser. No. 14/811,824, entitled "Online Asset Recommendation System"). During the engagement 500, the values derived from consumption of assets in the set are summed to get the total asset value. In the example, if the user consumes all of $a_i$ 501, all of $a_j$ 502, and 50% of $a_k$ 503, and the value of consuming an entire asset is θ (for each asset 504-506) while consumption of 50% of an asset yields 0.5 θ units of value, then the consumption pattern in the example would yield an accumulated value of θ(1+1+0.5)=2.5 θ units. The user need not consume all assets, for example, the user may end the engagement after consuming only 75% of asset in which case the accumulated value is 0.75 θ standard units.

2.3. Selection of Asset Sets for Pre-Computation

Based on an analysis of historical consumption data by geographic location, h, or by other sources made available to it, the APM can use—as a formula input—the expected number of times, $\hat{K}_{i,t}(h)$, during the engagement window that each asset $a_i$ will be consumed in the first position (that is, consumed in the anchor asset position) by a user in the collection $c_t(h)$ at location h. It is assumed that the value $\hat{K}_{i,t}(h)$ is both predictable and available to the APM during the process of selecting the appropriate levels of the various input variables required to maximize the objective function defined in Equation 1. As a risk mitigation measure, the APM may decide, at their discretion, to inflate and/or deflate the forecasted demand values to ensure that forecast errors are considered when attempting to optimize the objective function in the face of uncertainty. The predicted number of times need not be based entirely on forecasting processes that use historical engagement data. For example, if there is cause to believe that a particular asset may be demanded for consumption in the future due to its popularity or association with a known, future event such as a major sporting match, weather event (e.g., hurricane), entertainment awards event, etc., then the total number of expected views, $\hat{K}_{i,t}(h)$, at location h can be adjusted to reflect the future demand.

In choosing the asset sets that will be pre-computed and which will be dynamically computed, the forecasted demand for each possible anchor asset $\hat{K}1,t(h)$ in the first position and its ascribe value, vt(a1) and multiplied to the total expected value $Vt(a1) = \hat{K}1,t(h) \times vt(a1)$ for the anchor asset that would be realized across all views for that asset in the anchor position. Then, for each anchor asset ai (1)—for which the user a user will explicitly select item for delivery and consumption—a collection of all possible assets sets that are share the same anchor asset can be enumerated. The total value of each possible asset set can then be computed and, for each possible asset set that follows a particular anchor asset.

2.4. Measurement of Computation Burden

At time t, the pre-computation of assets at location g will reflect the number of distinct asset sets expected to be delivered to various locations h from location g. Since $b_{t,}(d(g);S-1)$ is the burden, measured in u, of dynamically computing a set of additional assets $d_t(g)$ of length S−1 at time t and storage location g after the initial asset $a^{(1)}$ has been delivered by a user, $b_{t,}(p(g);S)$=the burden, measured in u, of pre-computing a set of computed assets $p_t(g)$ of length S at time t and storage location g base on the expected consumption of a specific anchor asset, $P^{(S)}$ is the number of pre-computed asset sets $p_t(g)$ of size S, $R^{(S)}$ is the number of dynamically computed asset sets $p_t(g)$ of size S, that are generated after the initial asset has been delivered, $\hat{K}_{i,t}(h)$ is the expected number of times that asset $a_i$ will be consumed in the initial/anchor position in time t at location h.

Then the total expected computation costs at storage location g is, S>1 are precomputed:

$$L_{t,g}\hat{K}_{i,t}(h) \times ([P^{(S)} \times b_{t,r}(p(g);S)] + [R^{(S)} \times d_{t,g}(a_i;S-1)])$$ [Equation 3]

Noting that:
if no asset sets are precomputed, then $P^{(S)}=0$,
if no asset sets are dynamically computed, then $R^{(S)}=0$.

2.5. Measurement of Storage Burden

At time t, the storage of assets at location g will reflect the number of distinct assets expected to be available to various locations h from location g. Defining;
- $f_{t,g}(a_i)$ is the burden, measured in u, of storing an individual asset, $a_i$, at time t at storage location g, and
- $f_{t,g}(a_i;S)$ is the burden associated with storing pre-computed sets of assets of size S
- M is the size of the total set of distinct assets $A_t(g)$,
- $P^{(S)}$ is the number of pre-computed asset sets $p_t(g)$ of size S, then the total storage costs at storage location g is, noting that P=0 if no asset sets with S>1 are precomputed;

$$F_{t,g} = [M \times f_{t,g}(a_i)] + [P^{(S)} \times f_{t,g}(a_i;S)]$$ [Equation 4]

2.6. Measurement of Delivery Costs

At time t, the delivery of assets from location g to location h will reflect the number of distinct assets and asset sets expected to delivered to various locations h from location g. Since
- $w_{t,}(\gamma(g \rightarrow h);1)$ is the burden, measured in u, of delivering an anchor asset $a^{(1)}$ at time t from storage location g to user collection at location $c_h$—denoted by the pair $\gamma_t=(g \rightarrow h)$,
- $w_{t,}(\gamma(g \rightarrow h);S')$ is the burden, measured in u, of delivering a set of assets ($p_t(g)$ of size S—or $d_t(g)$ of size S–1) at time t from storage location g to user collection at location $c_h$—denoted by the pair $\gamma_t=(g \rightarrow h)$,
- $P^{(S)}$ is the number of pre-computed asset sets $p_t(g)$ of size S,
- $R^{(S)}$ is the number of dynamically computed asset sets $p_t(g)$ of size S, that are generated after the initial asset has been delivered,
- $\hat{K}_{i,t}(h)$ is the expected number of times that asset $a_i$ will be consumed in the initial/anchor position in time t at location h.

Then the total storage costs at storage location g is, noting that $P^{(S)}=0$ if no asset sets with S>1 are precomputed;

$$D_t(g \rightarrow h) = \hat{K}_{i,t}(h) \times ([P^{(S)} \times w_t(\gamma(g \rightarrow h);S))] + [R^{(S)} \times w_{t,}(\gamma(g \rightarrow h);1) + w_{t,}(\gamma(g \rightarrow h);S-1))$$ [Equation 5]

Noting that:
If the computed set is delivered after selection of the anchor asset but not precomputed, the computed asset set size is S'=S–1.
If the total set is precomputed before selection of the anchor asset, then S'=S.
Sets that are dynamically computed require two delivery actions; one for the anchor asset of size 1 and one for the computed set of size S–1.
If all asset sets are of size 1, the equation collapses to $$D_t(g \rightarrow h) = \hat{K}_{i,t}(h) \times w_{t,}(\gamma(g \rightarrow h);1)$$ [Equation 6]

if no asset sets are precomputed, then $P^{(S)}=0$.
if no asset sets are dynamically computed, then $R^{(S)}=0$.

2.6. Measurement of Value Gain

For each asset set, regardless of whether it is dynamically computed after the selection of the anchor asset is precomputed, then the accumulated value for each pair of storage and consumption pairs is:

$$V_t(h) = \Sigma_{i=1}^{S} K_{i,t}(h) \times v(a_i)$$ [Equation 7]

And the total value across all user collection sites H is:

$$V_t = \Sigma_{h=1}^{H} V_t(h)$$ [Equation 8]

The total burden associate with storage, computation, and delivery from storage location g to user collection location h is:

$$B_t(g \rightarrow h) = F_{t,g} + L_{t,g} + D_t(g \rightarrow h)$$ [Equation 9]

And the total burden across pairs of storage locations G and user collection site H is:

$$B_t = \Sigma_{g=1}^{G} \Sigma_{h=1}^{H} B_t(g \rightarrow h)$$ [Equation 10]

Therefore the total Value Gain is:

$$\pi_t = V_t - B_t$$ [Equation 11]

With all of the components defined and the value gain equation assembled, this proposed invention will, in order to maximize the objective function, prescribe how the APM should:
- Which assets should be allocated to the various storage locations G
- Which storage location will serve users at each location H
- Which asset sets will be pre-computed and which will be dynamically computed. For the pre-computed asset sets, the term 'hot cache' is used to indicate the assets that are most likely to be selected by users in the anchor position and will allow immediate access of the sets at a lower delivery cost. The expectation is that the value gains from hot-caching will be greater than dynamic computing even though storage and computation cost will be increased. Additionally, the allocation of assets to the various storage sites is intended to further reduce delivery burden.

The choice of which anchor assets to store at various storage locations is a key step in the process. As discussed, the total value of each potential asset for storage is based on the product of the number of expected times the asset will be consumed and the value derived from each consumption of the asset. There are five conditions under which the expected volume, $\hat{K}_{i,t}(h)$, for anchor asset i at time t at location h can be assessed along with the value of the consumed $v_t(a_i)$ that are used to determine if the anchor asset will be stored at the location:

1. Historical demand—the anchor asset may have some historical consumption at various geographic locations and the average consumption events in previous time periods can be used as an estimate of volume at time t when the selection process for anchor assets is conducted,
2. Asset with no consumption history—this is a special case of the historical demand condition—the anchor asset's expected volume is zero and, once sufficient consumption events occur, its expected volume will change and the asset will have an increased chance of consideration for storage when compared against other anchor assets with non-zero volume,
3. Popularity—even though an asset may not have any historical consumption, it may be expected that it will in the period in which selection occurs—an example would be a known event that will likely increase demand for the asset such as if it associated with a key event such as a major sporting event, award ceremony, or unusual weather, 4. Contractual Positioning—there may be cases where a specific asset where the volume in the initial position is pre-set for an asset to increase its ability to be consumed—this may occur when the owner of the assets desires to promote certain assets, 5. Revenue—the per-unit value is altered to drive revenue—a premium on certain assets is applied that will increase its value and likelihood of being selected for storage (this can be done in conjunction will contractual positioning).

2.7. Asset Set Substitution in Storage

The APM decision process occurs for each location h every time step t. Since there is a finite limitation on storage for assets and asset sets, the selection process may result in a different set of asset sets for storage in time period t than what was selected in time period t−1. Because of this, some stored asset sets may be removed from storage and replaced by others if the computed value for un-stored asset sets suggest they should replace some existing stored asset sets. In that event, the substitution will result in the removal of asset sets from storage that no longer hold the highest value and the addition of new assets sets that have higher value gains. It should be noted that the contractual position and revenue conditions that affect value of assets can also be applied to computed/recommended assets and not just the anchor assets. For example, there may be a contractual obligation to show a specific asset in a position greater than 1 (not the anchor asset) and that contract may be associated with a premium on the value which would affect the expected value of the asset sets that contain the specific asset in the computed portion of the asset set.

In the following sections, the process for supporting the various decisions that the APM must make are presented incrementally, using various embodiments that start with the most simple case and graduating to the most complex case.

3.0. Example Embodiments 3.1. Baseline Embodiment: Single Storage Locations with no Precomputations In the baseline case, there exists a single storage location (G=1) to store and deliver asset sets to all locations H. There are no decisions regarding geographic allocations of assets to make and there is no hot-caching. Therefore, upon selection of the anchor asset $a^{(1)}$ by each user, the computed set of the remaining S−1 assets is generated and delivered separately from the anchor asset. Therefore, for each anchor asset consumed, there is a marginal burden involving the computation of one a computed and two delivery operations (the delivery of the anchor asset followed by a delivery of the computed set). With only one storage location g, the marginal burden associated with consumption of $\hat{K}_{i,t}(h)$ anchor assets is:

$$B_t(g \rightarrow h) = \hat{K}_{i,t}(h) \times [w_{t_c}(\gamma(g \rightarrow h);1) + w_{t_c}(\gamma(g \rightarrow h);S-1) + f_{t,g}(a_i;S-1) + d_{t,g}(a_i;S-1)] + (M \times f_{t,g}(a_i)/\hat{K}_{i,t}(h))$$ [Equation 11]

Where the final component $(M \times f_{t,g}(a_i)/\hat{K}_{i,t}(h))$ amortizes the storage burden of M assets across each user.

The total value achieved at each storage site is $V_t(h) = \Sigma_{i=1}^{S} K_{i,t}(h) \times v(a_i)$ and the value across all consumption sites is $V_t = \Sigma_{h=1}^{H} V_t(h)$.

3.2. Embodiment: Multiple Storage Locations with no Precomputations

Deviating from the baseline case, we will now expand the number of storage locations (G>1) that will individually store and deliver asset sets to a subset of locations H. The pairings of storage and consumption locations will be unique so that a distinct location h will be delivery location for assets stored at one-and-only-one storage location g. FIG. 4 illustrates a case there exists an estimated demand for each anchor assets $\hat{K}_{i,t}(h)$ across various locations H at time t. If the APM has the ability to store, compute and deliver assets from any of G locations, it may be possible to increase the value gain (the objective is to maximize the value gain) by reducing the burdens associated with the storage, computation, and delivery by geographically allocating assets to the candidate storage sites. Referring to FIG. 6 as an example, assume that the APM has known geographically distributed demand in Central USA 601 in only H=3 three user collection locations (USA/California, USA/New York, Thailand/Bangkok) 602 with known demand and G=3 storage locations (Central USA, Western USA, and Central India) 604. If the total value of consumption remains fixed regardless of the storage locations of assets, and with no pre-computation costs in this example, the total burden is the sum of dynamic computation costs, storage and delivery. FIG. 6 expands the example where initially, all H=3 locations are served by single storage site G=1 (Central USA) 601. Assuming storage and pre-computation costs are not constant at all three sites, then the example in FIG. 6 shows how the knowledge about these costs can be used to determine if additional storage locations should be leveraged. In FIG. 6, the delivery burden associated with each asset set (first delivery of the anchor asset followed by delivery of the dynamically-computed set) 605 may differ for each pair of storage and user collection location (g,h)—along with storage and computing burden. For example, burden per each of the $\hat{K}_{i,t}(h)$ asset set demanded at each from the Central USA storage site by users in Bangkok, Thailand is 0.012 u per asset set 608 while burden for serving asset to USA/California from the Central USA site is only 0.002u 609. But, if the assets demanded in Thailand were instead stored in the Central India location, delivery costs would fall to 0.006u 611, and if stored in Western USA then the cost per delivered asset set would be 0.009u 610. By pairing the demand in Thailand with the supply in Central India, the net Value gain per asset set would be (due to a reduced burden) 0.006u 612. In the example, the maximization of value gain with the known inputs supplied to the APM, would suggest that the following (g→h) location pairs be used to increase value gain from a baseline of only G=1 site: (Central USA→USA/New York), (Western USA→USA/California), (Central India→Thailand/Bangkok). The burden for each location g would then be:

$$B_t(g \rightarrow h) = \hat{K}_{i,t}(h) \times [w_{t_c}(\gamma(g \rightarrow h);1) + w_{t_c}(\gamma(g \rightarrow h);S-1) + f_{t,g}(a_i;S-1) + d_{t,g}(a_i;S-1)] + (M \times f_{t,g}(a_i)/\hat{K}_{i,t}(h))$$ [Equation 12]

While the total burden would be $B_t = \Sigma_{g=1}^{G} \Sigma_{h=1}^{H} B_t(g \rightarrow h) I(g \rightarrow h)$ and $$I(g \rightarrow h) \begin{cases} 1 & \text{if storage location } g \text{ provides asset sets to user collection location } h \\ 0 & \text{otherwise} \end{cases}$$

If the value remains fixed regardless of storage locations, then the decision would be to undertake a reallocation of assets based on the reduced burden. Though simplified in this example, it is possible that the reallocation of assets may result in a single asset being stored in more than one of the G locations, thereby increasing burden and limiting the appeal of choice to geographically relocate some assets across multiple sites. However, if the assumption that value derived from consumption remains fixed despite geographic distribution of assets, there may be an adjustment to the value gain calculation whereby the value increases due to closer geographic proximity between a storage location and a user location. One example may be that the closer the two locations, the faster (in terms of time), the delivery occurs. If the delivery time is too long for a user, he/she may terminate the engagement of assets sooner—thereby reducing the actual consumption value.

3.3. Embodiment: Multiple Storage Locations with Precomputations

Deviating from the baseline case and the geographically distributed embodiment, an embodiment expands to having constant storage locations (G>1) that can individually store and deliver asset sets to a subset of locations H, but allow precomputation (or hot-caching) to occur. This would allow asset sets to be pre-computed a single time during an engagement window regardless of how many times $\hat{K}_{i,t}(h)$ an asset set is requested (via the selection of the anchor assets).

This will reduce the cost of computing at location g from $\hat{K}_{i,t}(h) \times (d_{t,g}(a_i;S-1)])$ to $\Sigma_{i=1}^{M'} d_{t,a}(a^{(i)},S-1)$ where M' is the number of assets for which a precomputed set is generated and This will reduce the delivery costs from $\hat{K}_{i,t}(h) \times ([P^{(S)} \times w_t(\gamma(g \rightarrow h):S))] + [R^{(S)} \times w_t(\gamma(g \rightarrow h);1) + w_t(\gamma(g \rightarrow h);S-1))$ to $\hat{K}_{i,t}(h) \times ([P^{(S)} \times w_t(\gamma(g \rightarrow h):S))]$ Storage costs will be increased, however, by $M' \times f_{t,g}(a_i;S)$ FIG. 7 illustrates examples of how hot-caching can reduce costs.

In that example, there is assumed to be n distinct assets that may be selected as the anchor asset. For the first asset in the example, there is a net lowering of burden of 0.004u (0.005u–0.001u) 704, 703, that would result from hot-caching asset 1 ($a_1$) 701. Since consumption at location h is expected to be $\hat{K}_{i,t}(h)=1000$ 705 and the value derived from consuming the set of assets delivered when $a_1$ is the anchor asset is 1.051 702. Then the net value gain from hot-caching the asset sets associates with $a_1$ is then: [1000*(1.051–0.005)]–[1000*(1.051–0.001)]=4u 706-708. The recommendation to the APM would then be to cache asset 1 at location g.

Figure 8B:
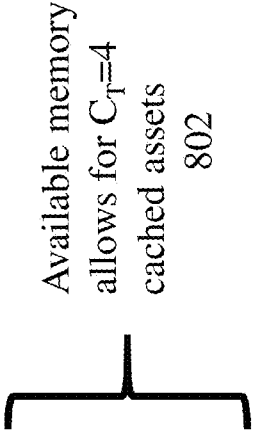

However, when there exists an upper limit $q_t(g)$ on the storage of assets and asset sets at location g, the APM (or the system can do this automatically according to customer preferences) can decide which asset sets to precompute cache and which to compute dynamically. In FIG. 8a, an example of this decision is shown where the value increment gained from caching is computed for each asset set, and the asset sets having positive gains are then sorted by expected gain. If there is a limit of $C_t(g)$ asset sets that may be cached and $M' > C_t(g)$ can be caches, it is a simple matter of selecting the ones with the highest positive value gains. In this example, if $C_t(g)=3$ 801, then asset sets 2, S–1, and S, would have the highest value gains and would be cached and all others would not be cached. FIG. 8b shows an example where $C_t(g)=4$ 802 and asset sets 2, n–4, n–1, and n, would have the highest value gains and would be cached and all others would not be cached.

3.4. Embodiment: Dynamic Hot Caching Across Edge Servers

An embodiment further expands the concept to multiple edge server locations that can more efficiently store and deliver asset sets to a geographically or lower latency subset of locations H and implement hot-caching. As with the previous example, asset sets can be pre-computed a single time during an engagement window regardless of how many times $\hat{K}_{i,t}(h)$ an asset set is requested (via the selection of the anchor assets). As noted above, the user may transition from zero/partial/or full-consumption of each ordered asset. The zero or partial cases may sometimes not be due to the asset itself, but rather due to the user's viewing experience, e.g., excessive delays loading an asset into a player or display program, stalling of the player or display program due to starvation, drop outs or tearing of asset frames due to corrupted data, etc. These problems may be caused by server overload, network latency, etc. Hot caching asset sets on edge servers may improve the user's viewing experience and thus, reduce any skewing of the likelihood that an asset is viewed.

Figure 9:
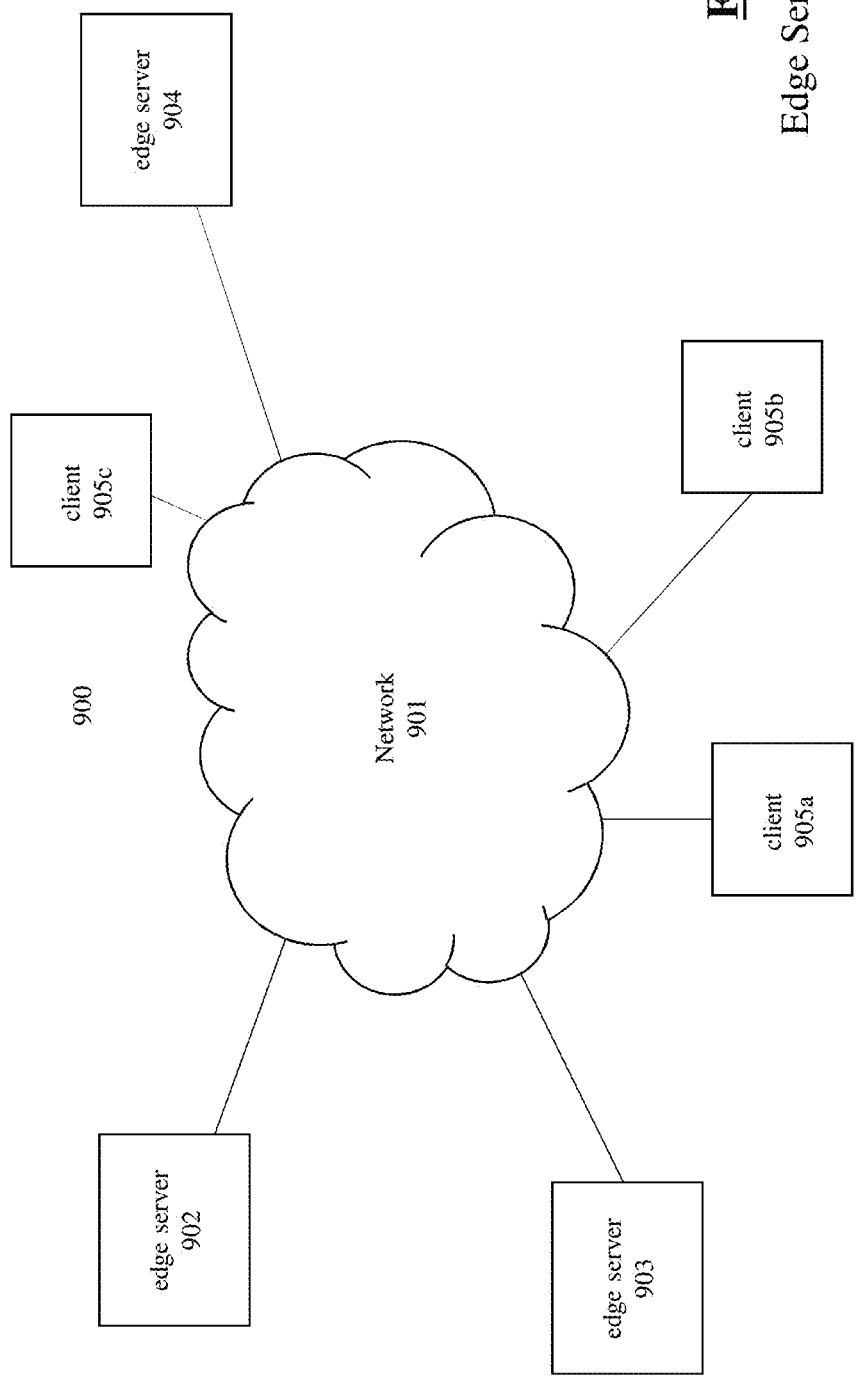
FIG. 9 illustrates the dynamic hot-caching of select assets for delivery on edge servers, according to an embodiment of the invention.

FIG. 9 shows a cloud scenario 900 where edge servers 902, 903, and 904, are distributed across a network area 901 in order place content as close as possible to client devices in the network. This allows the reduction of latency to client devices. For example, client devices 905a and 905b may be located geographically close to each other, where edge server 903 has the best latency for client device 905a, but the latency between edge server 904 may have a lower latency for client device 905b. Similarly, client device 905c may be geographically close the edge server 904 but may have a lower latency with edge server 902. Thus, storing asset sets in certain edge servers may reduce latency to certain geographical areas and stabilize asset statistics.

In an embodiment, relevancy and popularity may be factors as to the selection of edge servers to store certain asset sets. An anchor asset may not be relevant or popular in a certain geographic area and therefore, asset sets related to the anchor asset do not have to be considered to be hot cached in a set of servers or edge servers located in that geographic area. For example, an anchor asset in the English language and related to a country music star may not be relevant or popular in Russia. This means that hot caching an asset set that includes the anchor asset in a server or edge server in Russia is not needed.

Similar to the substitution of asset sets, the decision on dynamic hot-caching at each time step t may also lead to a need to substitute hot-cached asset sets. The APM hot-caching decision process occurs for each location h every time step t. Since there is a finite limitation on what may be hot-cached, the selection process may result in a different set of asset sets for caching in time period t than what was selected in time period t–1. Because of this, some stored asset sets may be removed from cache and replaced by others if the computed value for uncached asset sets suggest they should replace some existing cached asset sets. In that event, the substitution will result in the removal of asset sets from cache that no longer hold the highest value and the addition of new assets sets in the cache that have higher value gains. It should be noted that the contractual position and revenue conditions that affect the value of assets relevant to the cache decision can also be applied to computed/recommended assets and not just the anchor assets. For example, there may be a contractual obligation to show a specific asset in a position greater than 1 (not the anchor asset) and that contract may be associated with a premium on the value which would affect the expected value of the asset sets that contain the specific asset in the computed portion of the asset set.

4.0. The Asset Portfolio Manager as a Single Entity

Figure 10:
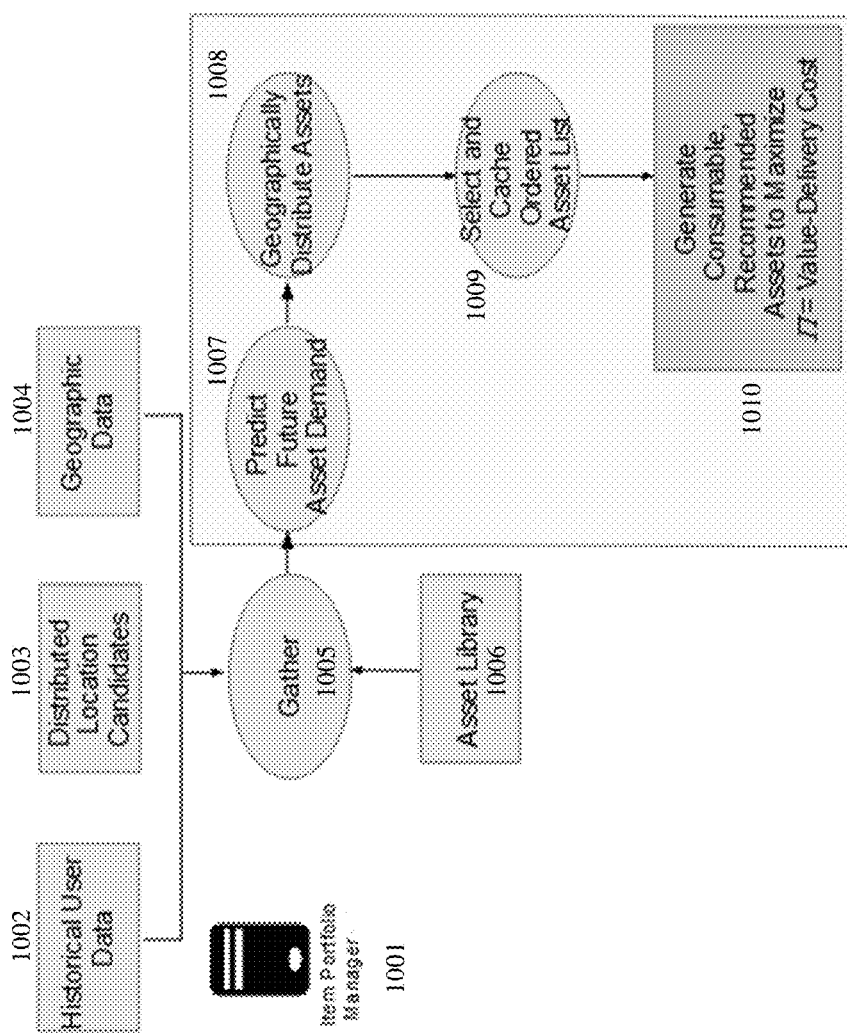
FIG. 10 illustrates the Asset Portfolio Manager (APM) collating various forms of information to select assets for delivery, according to an embodiment of the invention.

In an embodiment, the entire process of generating recommendations may be centrally located and preferences indicated by a single entity—the "asset portfolio manager" (or "APM")—that, while at a fixed location, can: access all data, access all algorithms, and assign asset values as described herein. Associated recommendations can then be generated that are made available to users engaging the asset(s) selected from the portfolio. The responsibility of the APM—which may be a person operating the system, the system itself, or a combination of the two—may be assigned to the owner of the asset portfolio or another party given authorization to generate recommendations and pursue revenue acquisition on behalf of the owner of the asset portfolio. FIG. 10 depicts the flow of information that is managed by the APM 1001 and encompasses asset set recommendations, asset value, and the storage and leveraging of recorded historical interactions, third party data (if applicable), and the recommendation algorithm and the asset portfolio. The various input data elements (historical asset demand, data, storage/delivery speed of candidate sites for storing assets, the geographic locations of both the candidate storage site(s) and the users demanding assets, and the available asset library) are collected and collated by the APM. The APM then projects the historical demand for available assets, selects how to geographically distribute them, builds the ordered recommendation sets, and makes them available for consumption.

5.0. Continuous Play Video Recommendations

The system can use a version of any of the embodiments described herein to maximize the expected value associated with a set of video (a type of electronic asset) recommendations for consumption. The system allows a continuous-play feature that seamlessly builds a sequential set of videos that may be consumed without interruption. The feature allows an entire video playlist to be constructed and consumed and, should user interaction suggest that a particular video asset consumption has terminated, present a revised list of recommendations.

An embodiment allows asset owners to modify the set of videos with their video recommendations. The system provides a continuous-play feature that seamlessly builds a sequential set of videos that may be viewed without interruption. Importantly, the asset valuation may be generated by a single item portfolio manager located as a distinct geographic location. The recommendation engine is a sophisticated set of algorithms that employ any combination of: demographic, geospatial, historical engagement data, including user-level features, asset valuation, video keywords that are used to partition the data into groups and provide group-level recommendations, etc. In many cases, where sufficient information on users exist, groups represent single users. Additionally, a user may sometimes engage the recommendation engine in one of the following modes:
 a) as a single user seeking recommended videos that appeal to his/her interest, or
 b) as a representative of a household seeking recommendations for multiple users sharing a video engagement.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

6.0. Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
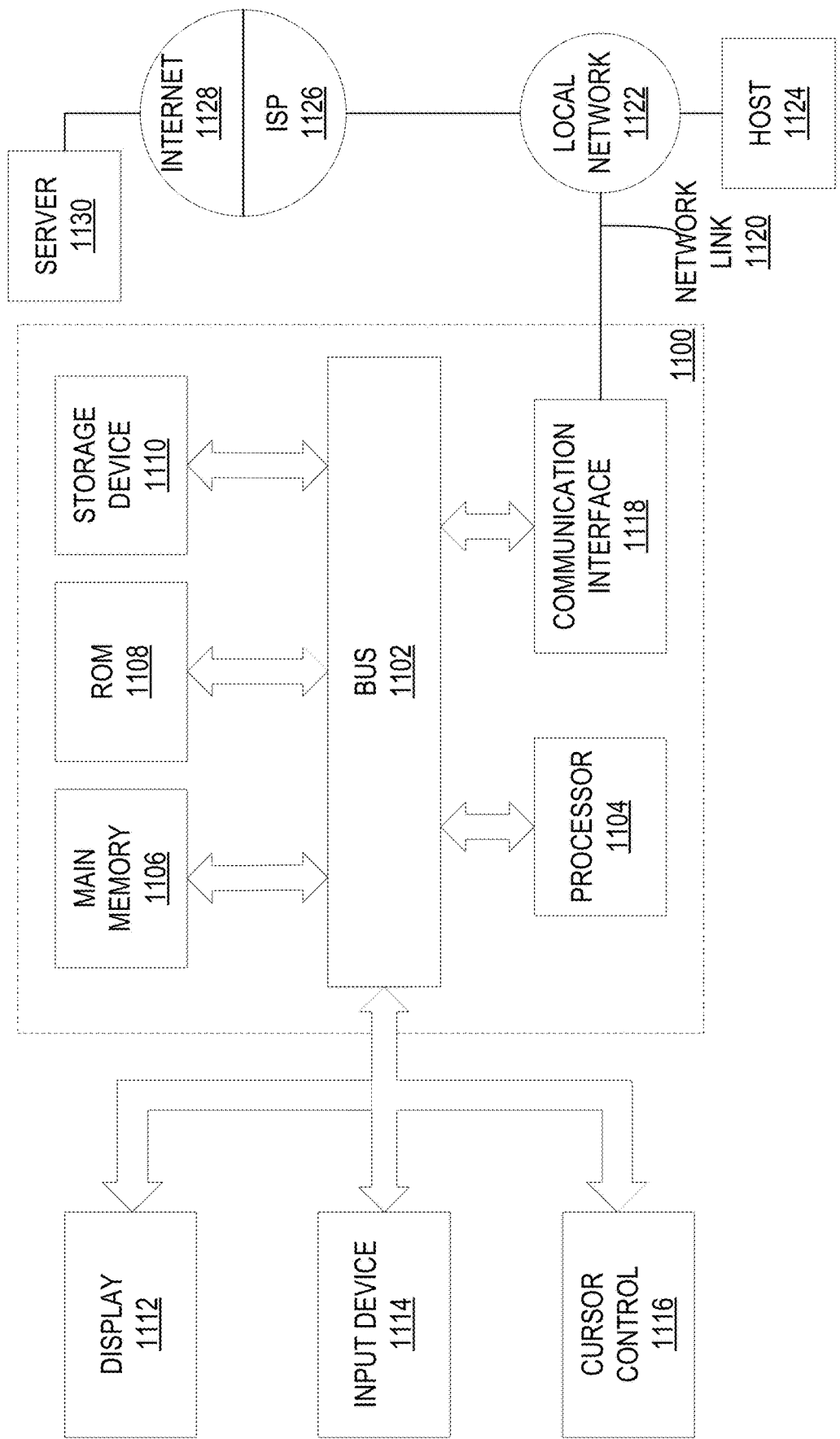
FIG. 11 illustrates an example hardware platform on which a computer or a computing device as described herein may be implemented.

For example, FIG. 11 is a block diagram that illustrates a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

7.0. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A method, comprising:
    selecting a specification of an anchor asset among a plurality of assets, the anchor asset selected based on a caching gain calculation for the anchor asset, the caching gain calculation includes a likelihood that the anchor asset will be consumed prior to assets in an ordered set of assets are consumed, the ordered set of assets are precomputed before user consumption of the anchor asset;
    selecting a variety of assets from the plurality of assets based on a relationship to the anchor asset, the variety of assets including any combination of: audio, video, text, or image, wherein the variety of assets are selected based on a relationship with the anchor asset;
    arranging the selected variety of assets into the ordered set of assets to be consumed after the anchor asset during an online engagement;
    caching the anchor asset and the ordered set of assets on two or more servers among a plurality of servers, the anchor asset and the ordered set of assets are available for delivery to client devices from the two or more servers, the two or more servers are geographically diverse.

2. The method of claim 1, wherein the two or more servers are selected from the plurality of servers based on a delivery cost calculation.

3. The method of claim 1, wherein the caching gain calculation calculates a burden of not caching the anchor asset on a server and an overall caching gain when the anchor asset is cached on a server.

4. The method of claim 1, wherein the two or more servers are selected from the plurality of servers based on a memory cost calculation.

5. The method of claim 1, wherein the two or more servers are selected from the plurality of servers based on a caching gain calculation for the anchor asset and the selected variety of assets.

6. The method of claim 1, wherein the anchor asset and the ordered set of assets are removed from one or more servers of the two or more servers when a second anchor asset is calculated to have a better caching gain calculation than the anchor asset.

7. The method of claim 1, wherein the arranging the selected variety of assets arranges a particular asset in a specific position within the selected variety of assets based on a value of the specific position.

8. One or more non-transitory computer-readable storage media, storing one or more sequences of instructions, which when executed by one or more processors cause performance of:
- selecting a specification of an anchor asset among a plurality of assets, the anchor asset selected based on a caching gain calculation for the anchor asset, the caching gain calculation includes a likelihood that the anchor asset will be consumed prior to assets in an ordered set of assets are consumed, the ordered set of assets are precomputed before user consumption of the anchor asset;
- selecting a variety of assets from the plurality of assets based on a relationship to the anchor asset, the variety of assets including any combination of: audio, video, text, or image, wherein the variety of assets are selected based on a relationship with the anchor asset;
- arranging the selected variety of assets into the ordered set of assets to be consumed after the anchor asset during an online engagement;
- caching the anchor asset and the ordered set of assets on two or more servers among a plurality of servers, the anchor asset and the ordered set of assets are available for delivery to client devices from the two or more servers, the two or more servers are geographically diverse.

9. The one or more non-transitory computer-readable storage media of claim 8, wherein the two or more servers are selected from the plurality of servers based on a delivery cost calculation.

10. The one or more non-transitory computer-readable storage media of claim 8, wherein the arranging the selected variety of assets arranges a particular asset in a specific position within the selected variety of assets based on a value of the specific position.

11. The one or more non-transitory computer-readable storage media of claim 8, wherein the caching gain calculation calculates a burden of not caching the anchor asset on a server and an overall caching gain when the anchor asset is cached on a server.

12. The one or more non-transitory computer-readable storage media of claim 8, wherein the two or more servers are selected from the plurality of servers based on a memory cost calculation.

13. The one or more non-transitory computer-readable storage media of claim 8, wherein the two or more servers are selected from the plurality of servers based on a caching gain calculation for the anchor asset and the selected variety of assets.

14. The one or more non-transitory computer-readable storage media of claim 8, wherein the anchor asset and the ordered set of assets are removed from one or more servers of the two or more servers when a second anchor asset is calculated to have a better caching gain calculation than the anchor asset.

15. An apparatus, comprising:
- one or more processors; and
- a memory storing instructions, which when executed by the one or more processors, causes the one or more processors to:
  - select a specification of an anchor asset among a plurality of assets, the anchor asset selected based on a caching gain calculation for the anchor asset, the caching gain calculation includes a likelihood that the anchor asset will be consumed prior to assets in an ordered set of assets are consumed, the ordered set of assets are precomputed before user consumption of the anchor asset;
  - select a variety of assets from the plurality of assets based on a relationship to the anchor asset, the variety of assets including any combination of: audio, video, text, or image, wherein the variety of assets are selected based on a relationship with the anchor asset;
  - arrange the selected variety of assets into the ordered set of assets to be consumed after the anchor asset during an online engagement;
  - cache the anchor asset and the ordered set of assets on two or more servers among a plurality of servers, the anchor asset and the ordered set of assets are available for delivery to client devices from the two or more servers, the two or more servers are geographically diverse.

16. The apparatus of claim 15, wherein the two or more servers are selected from the plurality of servers based on a delivery cost calculation.

17. The apparatus of claim 15, wherein the caching gain calculation calculates a burden of not caching the anchor asset on a server and an overall caching gain when the anchor asset is cached on a server.

18. The apparatus of claim 15, wherein the two or more servers are selected from the plurality of servers based on a caching gain calculation for the anchor asset and the selected variety of assets.

19. The apparatus of claim 15, wherein the anchor asset and the ordered set of assets are removed from one or more servers of the two or more servers when a second anchor asset is calculated to have a better caching gain calculation than the anchor asset.

20. The apparatus of claim 15, wherein the arranging the selected variety of assets arranges a particular asset in a specific position within the selected variety of assets based on a value of the specific position.

* * * * *